June 9, 1942. M. TENENBAUM 2,285,472
FIGURE
Filed Dec. 30, 1937 4 Sheets-Sheet 1
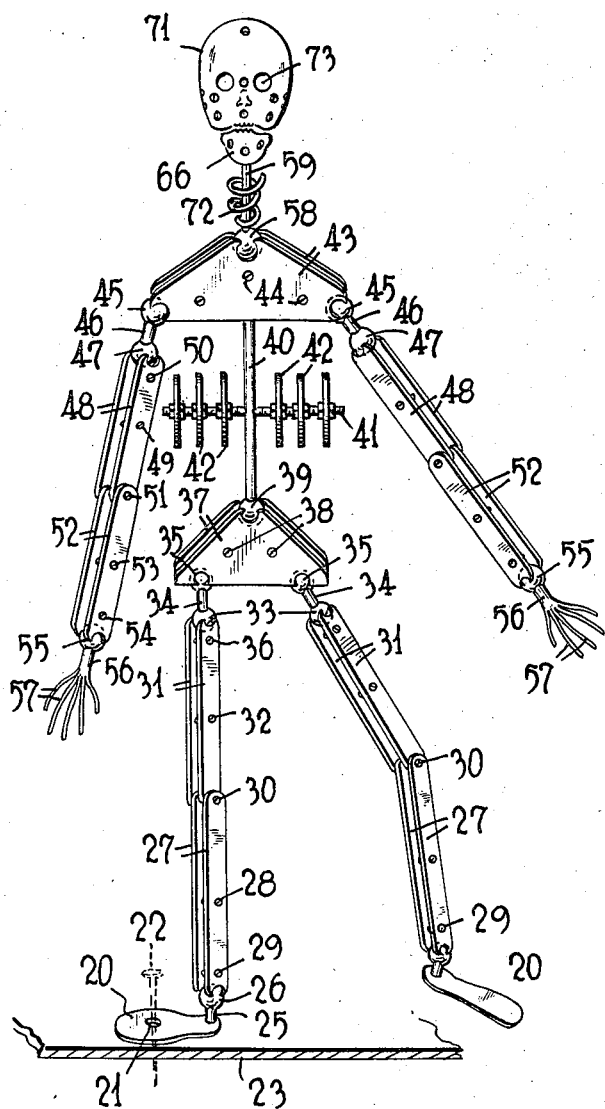
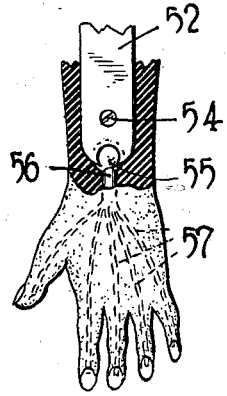
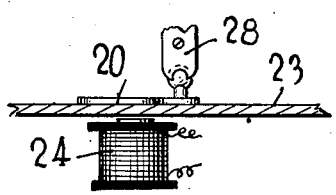
Inventor
Milton Tenenbaum
By Karl Fenwig
his Attorney June 9, 1942.    M. TENENBAUM    2,285,472
FIGURE
Filed Dec. 30, 1937    4 Sheets-Sheet 2
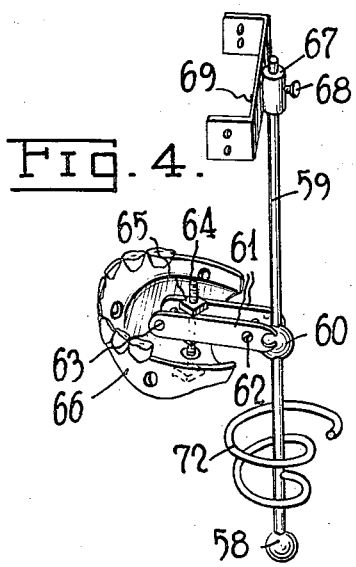
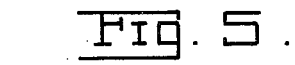
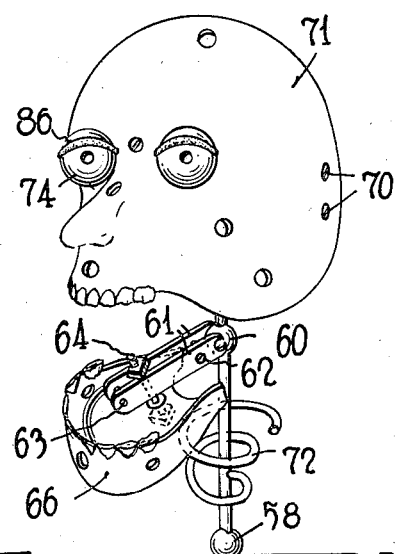
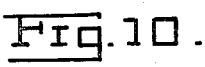
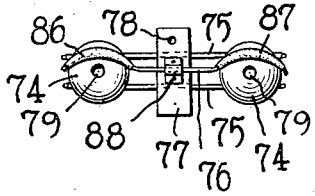
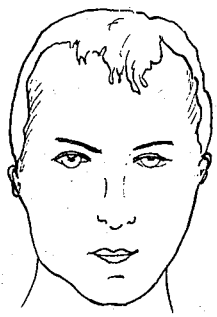
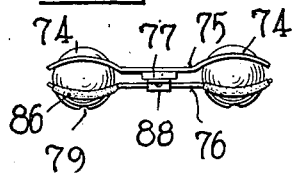
Inventor
Milton Tenenbaum,
By Karl Fenwig
His Attorney

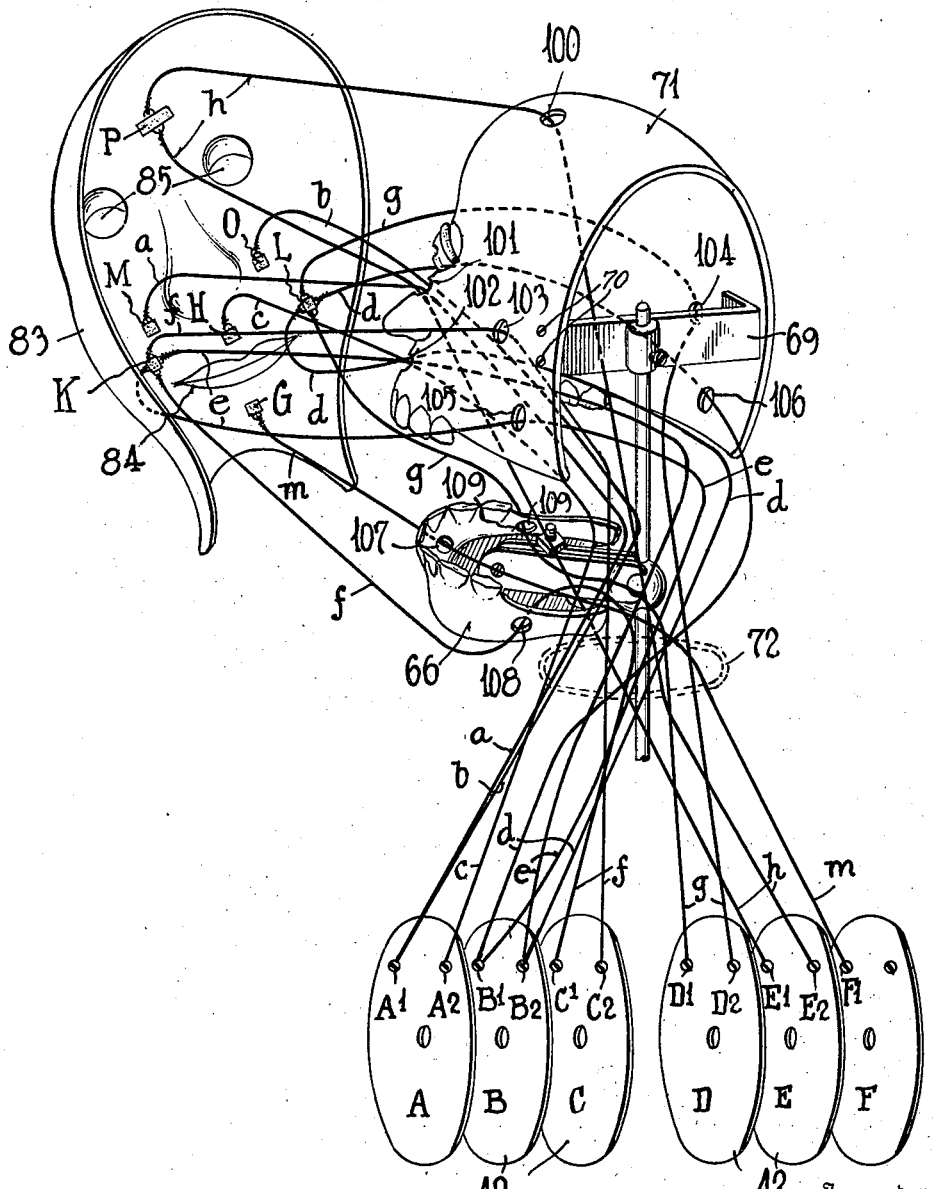

June 9, 1942.  M. TENENBAUM  2,285,472
FIGURE
Filed Dec. 30, 1937  4 Sheets-Sheet 4
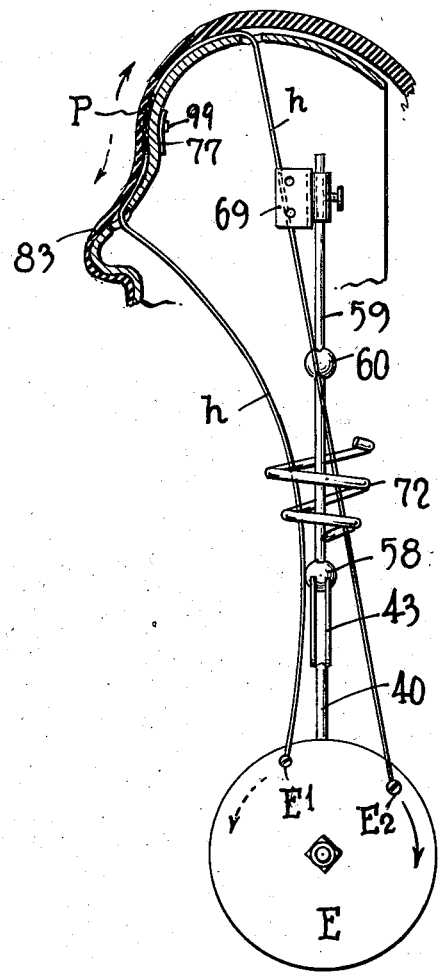
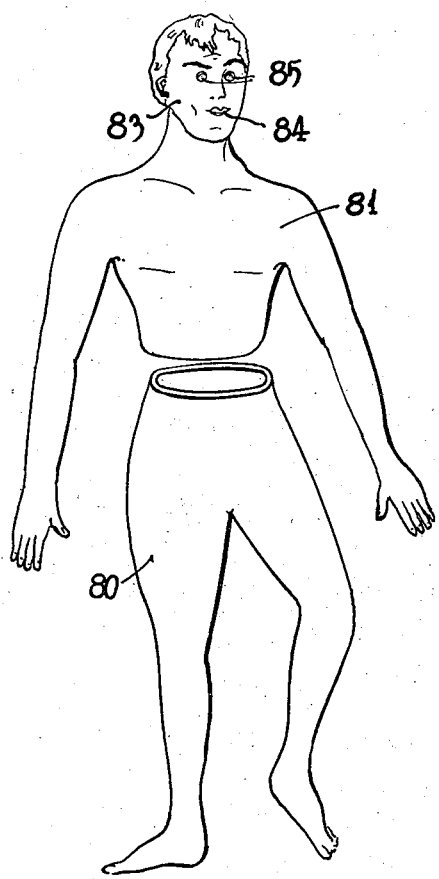
Inventor
Milton Tenenbaum
By Karl Fenning
His Attorney Patented June 9, 1942

2,285,472

UNITED STATES PATENT OFFICE 2,285,472

FIGURE

Milton Tenenbaum, Brooklyn, N. Y.

Application December 30, 1937, Serial No. 182,589

15 Claims. (Cl. 46—162)

The invention relates to figures representing human beings or animals so formed that they are capable of assuming and holding in varying degrees substantially any or all positions of body or feature characteristic of humans or animals.

For convenience and brevity the invention will be described with respect to a figure representing a human being. It will be understood, however, that the invention is not so limited and that changes in form to represent other animate objects may be made.

In general the figure comprises a skeleton-like structure which is provided with joints simulating the joints in the human body and placed at substantially the points corresponding to some or all of the positions of the joints in the human body. In such small parts as the fingers it may be desirable to employ flexible members instead of jointed members. The head and skull may ordinarily be a rigid member, it being preferable, however, to have the lower jaw or chin portion separate therefrom or jointed thereto.

A suitable covering for the skeleton structure may be provided. When desired padding between the skeleton and the covering may be provided. It may be convenient and an advantage to have the cover made of rubber or some such readily flexible and elastic material. It may be desirable to have the cover made in two portions, one including the legs and the lower portion of the torso and the other including the head, arms and upper portion of the torso. The portion covering the head, or at least that portion representing the countenance, may preferably be especially thin and flexible so that it may be readily manipulated and deformed as in human life.

Eyes may be mounted in the skull in such a way as to be readily movable and adjustable and associated with them may be members for engaging the portion of the countenance cover adjacent them so as to form representations of eyelids which may also be movable or adjustable.

The entire structure may be movable and adjustable and the arrangement preferably will be such that the figure will remain in any position to which it is adjusted. The portion of the cover representing the countenance may be provided with mechanism for moving and holding various parts thereof in such a way as to produce substantially any desired imitation of aspects of human countenances. There may thus be provided means for representing aspects or attitudes corresponding to any sentiments, feelings or expressions. These representations need not be limited to the countenance alone but the entire figure may be adjusted to assume characteristic positions associated with the facial expression for the time being. Means may also be included for fastening the figure in any attitude.

It may be caught on to a base which when desired may be associated with any permanent or adjustable or movable background.

The possibilities of use of the figures are numerous. A plurality of figures may be dressed and associated together so as to portray any desired social activity or scenic effect. They may be introduced, for instance, onto a stage or the representation of a stage and by successive adjustments may represent any desired continuity, action or story. Single or grouped figures may be used for such purposes as advertising or other uses to which lay figures are adapted or applied. They may be used as dolls or ventriloquists' dummies, etc.

Because of the fact that the figures are adjustable even by very slight movements at the joints or at portions of the countenance they may be especially adapted to represent successive changes from one attitude or aspect to another attitude or aspect. Thus it may be possible to take photographs or pictures of the figure or figures repeatedly as slight adjustments are made in transition from one aspect or attitude to another and then by associating the pictures so taken and showing them in rapid succession the appearance of continuous movement from one attitude or aspect to another may be produced. This may be desirable for instance in the manufacture of so called animated motion pictures or the like.

The invention may be embodied in many forms and may represent many different living and moving beings, either those present in nature or those imagined and designed. The details of structure, assembly and formation may thus be widely varied. For the purpose of illustration and disclosure of the invention a figure representing a human being will be described.

In the accompanying drawings Figure 1 is a perspective view of the skeleton of the figure, some of the adjusting mechanism being omitted. Fig. 2 is a plan view, portions being broken away, illustrating a hand. Fig. 3 is a fragmentary elevation indicating an optional method of holding the figure on a base or background. Fig. 4 is a perspective view of a portion of the mechanism above the body of the figure, showing the jaw and means for supporting the skull. Fig. 5 is a perspective view similar to Fig. 4 showing the skull in place. Figs. 6 and 7 are front elevation and plan respectively of the eye supporting mechanism. Fig. 8 is an expanded perspective fragmentary view illustrating the means for controlling and adjusting the cover for the countenance. Fig. 9 is a fragmentary vertical section illustrating a portion of the mechanism for adjusting the cover for the countenance. Figs. 10, 11 and 12 are front elevations of the countenance of the figure in different adjustments illustrating various aspects which may be given to the countenance. Fig. 13 is a perspective view of a two part cover for the entire figure.

In Fig. 1 members 20 are provided shaped somewhat to resemble feet. One or both of these may be provided with holes 21 through which may pass a pin or nail 22 to hold the feet and the accompanying figure in position on any suitable base 23.

As illustrated in Fig. 3 an electromagnet 24 energized by any suitable means may be provided to hold the feet members 20 in position on the base 23. Of course in this instance the feet members 20 will be of iron, steel or some suitable magnetic material.

The figure may be held in one location while its attitude or aspect is changed or it may be held in different locations as the aspects or attitudes change.

Rising from the heel portion of the foot 20 is a small shank 25 terminating in a ball 26 which may rest in a suitable seat provided at the end of the two members 27. The members 27 may be held together by any suitable means such as a bolt or screw 28 threaded into both plates. Adjacent the seats for the balls 26 is an adjusting screw 29 which is threaded into one plate 27 only and by adjusting it the tension of the plates 27 on the ball 26 may be adjusted thus making the ankle joint stiff or loose. This type of adjustment may be used throughout the figure making it possible thus to fasten the portions in any adjusted position or making it possible for them to be moved under pressure and remain as adjusted or to be loosely connected as may be desirable in illustrating dancing or other attitudes.

The knee joint may be formed by bolts 30 fastening the upper ends of the bars 27 to bars 31. The bars 31 may be held together and in position by bolts 32 and may be provided at the upper ends with seats for balls 33 on short rods 34 terminating in balls 35. Screws or bolts 36 adjacent the seats for the balls 33 may be provided for manipulating the bars 31 and adjusting the tension on the balls 33. Two members 37 which may be similar and triangular in form may be held together and adjusted by screws 38. In and between the plates 37 are provided seats for the balls 35 of both legs. In and between the plates 37 at their tops may be provided a seat for a ball 39 from which rises a rod 40 more or less simulating the spine. Carried by the rod 40 is a transverse shaft 41 on which are rotatably mounted disks 42 for a purpose to be explained later, friction between the disks and the rod 40 being relied on to control rotation and maintain each disk in adjusted position. The rod 40 carries at its upper end a pair of plates 43 which are illustrated as triangular in shape and as provided with adjusting screws 44 adjacent their corners in which are provided seats for balls carrying arms and head. The arm balls 45 are provided with rods 46 terminating in balls 47 having bearings in members 48 which are held together by bolts 49 and provided with adjusting screws 50. At their lower ends the plates 48 are connected by means of bolts 51 to fore arm members 52 which are held together by bolts 53 and are provided at their lower ends with adjusting screws 54 adjacent the seats for wrist balls 55, from which projects rods 56 terminating in flexible separate members 57 forming the thumb and fingers which, as illustrated in Fig. 2, thus produce a hand which is flexible and is provided with flexible thumb and fingers. The flexibility may be such that the hand may assume and keep any attitude and may grasp and hold an article when desired. At their upper corner the plates 43 provide a bearing seat for a ball 58 from which rises a rod 59 having intermediate its ends a ball 60 (see Figs. 4 and 5). Engaging and supported by the ball 60 are a pair of plates 61 provided with an adjusting screw 62 near the bearing and held together at their opposite ends by a bolt 63. On a depending bolt 64 passing between the bars 61 are nuts 65 engaging the top and bottom edges of the bars 61. The depending head of the bolt 64 may rigidly engage or be embedded in a jaw member 66 which may preferably be made of papier-mâché or some other relatively rigid material. At its top end the rod 59 carries a sliding tube 67 provided with a set-screw 68 for holding it in position. Mounted on the sliding tube 67 is a bracket 69 to which may be fastened in any suitable way as by screws 70 a more or less rigid skull member 71 which may be made of papier-mâché or any other relatively rigid material similar to the jaw member 66. On the rod 59 below the jaw supporting ball 60 may be mounted an open coil spring 72 to simulate the neck and for a purpose to be described.

Screws 28, 32, 53, 49 and 62 not only hold their respective plates together but since they are threaded into both plates they serve to keep the members apart thus increasing the tension at the bearings between the plates as the adjusting screws are operated.

Through suitable cavities 73 in the skull 71 may project balls 74 representing eyes. The balls may be supported between rear wires 75 and a front wire 76 carried by a plate 77 punctured at 78 to receive a screw 99 by which it may be fastened to the skull 71 and hold the eyeballs 74 in their sockets. The pupils of the eyes may be represented by holes 79 in the balls 74. A pin or a pencil or the like may be inserted in the pupil 79 and the eyes may then be rolled, rotated and adjusted in their bearings between the wires 75 and 76 by which they are grasped tightly enough to retain them in any adjusted position.

Over the structure thus assembled may be placed a suitable covering which may take any suitable form, for instance as indicated in Fig. 13, there may be one portion 80 covering the legs and lower part of the torso and an upper portion 81 covering the head and upper portion of the torso. It will be understood that such a structure may be moved, altered, adjusted or bent at any or all of its joints in suitable directions to take the attitude or aspect desired. It will be noted that the wrists are ball and socket joints, the ankles are ball and socket joints, the hips and shoulders are double ball and socket joints, there is a ball and socket joint at the base of the spine as well as a separate ball and socket joint at the base of the neck. The lower jaw is mounted on a ball and socket joint while the elbows and knees are provided with simple joints.

With such an arrangement it is possible to place the figure in a multitude of different positions or attitudes and since the joints may be adjusted or tightened they may be so arranged so as to provide sufficient friction to make the figure remain in any attitude to which it has been adjusted. It will be understood that the covering 80—81 may be of any suitable material and may be of any desired thickness. It may be desired to provide padding between the frame illustrated in Fig. 1 and the covering 80—81 of Fig. 13, at some special portions or throughout the entire figure.

That portion of the covering 81 which represents the face or countenance of the figure (indicated at 83 in Fig. 13) may be provided with suitable openings 85 to reveal the eyes 74 and an opening to represent the mouth at 84. A portion of the front rod 76 carrying the eyeball 74 may be curved upward slightly as it crosses the eyeballs at 86 and the portion 86 of the wire 76 may preferably be attached to the upper portion of the opening 85 in the face covering 83. This may be done directly or if desired there may be a covering which may be an adhesive 87 applied to the portions 86 in advance. By this means the portions 86 may be pressed upward or downward with the adjustment of the eyeballs 74 or independently thereof to simulate opening or closure or partial opening or closure of the eyelids. Thus any aspect desired may be given to the eyes and the movement of the eyeballs 74 may be separate and independent of each other. Likewise the wire 76 may be slightly flexible so that its ends 86 may be moved separately and independently of each other to produce independent adjustment of the eyelids themselves. Indeed, for this purpose the wire 76 may be made as shown in two separate portions which may be clamped together and held on to the plate 77 by a central clamping member 88 which forms a bearing in which the parts of the wire 76 may turn or rotate.

In order to facilitate this arrangement and adjustment of the eyes it may be desirable to have that portion of the cover 83 adjacent and at the eye openings 85 extremely thin and flexible. Indeed the entire covering 83 for the face or countenance should preferably be very thin and flexible irrespective of the character of the remainder of the covering 80—81. This difference is especially important to make fully effective the means provided for adjusting and changing the aspect or attitude of the various portions of the face itself. It is notable that the skin of the human countenance is very flexible and shifts, moves and bends almost constantly during waking moments. In order to simulate this constant change in the human countenance means are provided for shifting and moving various portions of the face-covering 83. One means for accomplishing this involves wheels or disks 42 mounted on the shaft 41 carried by the rod 40 as illustrated more or less diagrammatically in Fig. 8 where six disks 42 are illustrated and marked respectively A, B, C, D, E, and F. These disks may be turned or adjusted by pressure on the covering 80—81. Each disk is provided with two pins marked respectively A1, A2, B1, B2, C1, C2, D1, D2, E1, E2, F1. Running from these various pins A1—F1 and A2—E2 are various cords passing through suitable holes in the skull member 71 or the jaw member 66 and engaging or fastened to the inside of the face covering 83 at suitable positions. The contact points on the inside of the face cover 83 include a member G placed below the mouth, a member H placed above the mouth and below the nose, a member K placed at one side of the mouth, a member L placed at the other side of the mouth, a member M placed at one side of the nose, a member O placed at the other side of the nose and a member P in the brow above the eyes. Each of these members may conveniently be fastened to the inside of the face-covering 83 in any suitable way. When the face member is of rubber for instance the members G to P may consist of pieces of sticking plaster or adhesive tape to or under which the various cords are fastened. The members G to P if desired may be slightly stiffer than the face covering 83 and they may be different suitable sizes to vary their influence on surrounding parts of the face it being particularly desirable that the piece P be wide so as to affect the brow more or less from side to side.

For the passage of the cords to the face member 83 holes are provided through the skull member 71 and the jaw member 66. Thus near the top of the center of the skull member 71 is provided a hole 100; at the upper part of the nose is provided a hole 101; just below the nose is provided a hole 102; in the left cheek is provided a hole 103; in the right cheek is provided a hole 104; below the left ear is provided a hole 105 and below the right ear is provided a hole 106. At the center of the front of the lower jaw 66 is provided a hole 107 and at the rear of the left side is provided a hole 108 there being a corresponding hole 109 through the rear of the right side.

Attached to the pin A1 are two cords a, b. The cord a passes upward and through the hole 101 and has its end attached to the member M. The cord b passes upward and through the hole 101 and ends at the member O to which it is attached. Fastened to the pin A2 is a cord c which passes upward and through the hole 102 to the member H to which its end is attached. To the pin B1 are attached the cords d and e. The cord d passes up and through the hole 106 and is fastened to the member L from which it continues passing through the hole 102 and to the pin B2. The cord e passes up and through the hole 105 to the member K to which it is fastened and from which it continues through the hole 102 and downward to the pin B2. The cord f is attached to the pin C1 and passes upward through the hole 108 to the member K to which it is fastened and from which it continues through the hole 103 to the pin C2. The cord g is fastened to the pin D1 and passes upward through the hole 109 to the member L to which it is fastened and from which it continues through the hole 104 and to the pin D2. The cord h is fastened to the pin E1 from which it passes upward and through the hole 101 to the member P to which it is fastened and from which it passes through the hole 100 to the pin E2. The cord m is fastened to the pin F1 and passes up and through the hole 107 to the member G to which its end is fastened. It will be understood that by manipulation or rotation of the various disks A to F the cords may cause the various portions of the face covering 83 to stretch or wrinkle and when suitable manipulation is made suitable aspects or appearances are given to the countenance, represented by the face member 83. Thus referring to Fig. 9 for instance, it will be seen that if the disk E is turned clockwise as indicated by the arrow in full lines the cord h will tend to lift the member P and cause a wrinkle or frown in the brow. When the disk E is turned in the counterclockwise direction as indicated by the dotted arrow, the member P will be pulled downward causing a different wrinkle or frown in the brow.

To hold together and guide the cords $a$ to $m$ in their passage from the disks A to F to the head they may be caused to pass through the loose coil spring 72 which will tend to hold them assembled keeping them from separating and giving them more or less smooth passage while keeping them from falling away or becoming tangled. Where the cords pass through the coil spring there may be bearing surfaces and leverage may be found to assure proper change in the countenance. Similarly the holes in the skull and jaw through which the cords pass may form bearing or leverage points to localize or distribute the tension of the cords as may be desired.

In Fig. 10 the countenance is indicated in normal position. In Fig. 11 the aspect has been changed by pulling apart the members H and G by proper manipulation of the disks A and F and by lifting the members K and L by drawing strings $g$ and $f$ through the holes 103 and 104. At the same time the brow has been lifted by moving the member P by proper manipulation of the disk E. In Fig. 11 the eyelids have been slightly closed by manipulation of the eyelid members 86. In Fig. 12 the eyes are illustrated fully opened by lifting the eyelid members 86. The brow member P has been restored to normal position and the members K and L have been forced together by proper manipulation of the cords $d$ and $e$ by disk B. At the same time the jaw member 66 has been moved upward by its supporting ball 60. By having the face cover very thin and elastic movement of the cords may pull or push not only at the point of attachment but in the neighborhood generally. Thus a wrinkle may be built up and form a bunch while at the same time stretching adjacent portions of the cover as occurs in the human skin.

Various other changes in aspect may be produced it being understood that the various disks may be moved singly or in various groups and to their full extent or only partially moved, or may be moved step by step so as to produce various gradations of expression.

The eyes also may be adjusted to look up or down or sideways independently or together either with or without manipulation of the eyelids themselves. The jaw member may be raised or lowered or may be moved to one side or to the other and these various adjustments and movements may be done independently or in various combinations with each other. It will be understood that the number of different aspects which may be given to the countenance may be almost limitless. At the same time the changes in attitude of the arms, legs, and torso may take place so that the attitudes of the body may correspond to the aspects of the countenance. Thus, for example, when fright or astonishment is to be expressed on the face the arms may be thrown upward and the body given a rigid or startled attitude, it being understood that the interrelation between the bodily attitude and the facial expression which occur in life may be accurately simulated.

I claim as my invention:

1. Body and limb members adapted to be adjusted to positions simulating attitudes of animals, a hollow skull member having holes therein, a supporting member on the body member for adjustably carrying the skull member, a jaw member adjustably mounted on the supporting member below the skull member, a flexible elastic covering member for the skull and jaw, cords attached to the covering member and passing through holes in the skull and jaw members and extending into the body member for manipulating and adjusting the cords so as to vary the aspect of the covering member.

2. A rigid skull member having holes for eyes, a plate fastened inside the skull member between the holes, bearing members on the plate extending to the holes, spherical eyes held adjustably in the bearings at the holes and extending partly through the holes, additional adjustable bearing members on the plate extending through the holes and holding the eyes on the first mentioned bearing members, a flexible covering for the skull having holes registering with the skull holes the edges of the holes in the covering being attached to the adjustable bearing members and adapted to be manipulated therewith.

3. A body member, a shaft therein, disks rotatably mounted on the shaft, a perforated head member mounted on the body member, a coil spring between the head and body members, a flexible elastic covering for the head member, and cords attached to the covering and to the disks and passing through the coil spring and perforations in the head member.

4. A rigid skull member, a rigid jaw member movable and adjustable both laterally and vertically with respect thereto, and a flexible elastic covering for the skull and jaw members.

5. In a figure, a body portion, a plurality of rotatable disks mounted in the body, leg members connected to the body by ball and socket joints, arm members attached to the body member by ball and socket joints, hands connected to the arm members by ball and socket joints, flexible fingers on the hands, feet attached to the leg members by ball and socket joints, means for holding the feet to support the figure in any position, a neck member fastened to the body by a ball and socket joint, a coiled spring loosely surrounding the neck member, a perforated jaw member fastened to the neck member by a ball and socket joint, a perforated skull member attached to the neck member, a face of flexible rubber for the skull and jaw members and provided with holes exposing underlying members, a cord fastened to the inside of the flexible face at one side of the mouth and passing through holes in the skull at both sides of the point of attachment and having its ends attached to one of the disks after passing through the coil spring, a cord fastened to the inside of the brow of the flexible face and passing through holes in the skull above and below the brow and having its ends fastened to another disk after passing through the coil spring, a strap depending from the inside of the brow of the skull, wires extending from the strap and forming bearings for eyes which project through eye-holes in the skull, and an additional flexible wire on the strap and extending over the eyes and attached to the flexible cover to simulate adjustable eyelids.

6. In a figure, a body portion, a plurality of rotatable disks mounted in the body, leg members flexibly connected to the body, arm members flexibly attached to the body member, hands flexibly connected to the arm members, flexible fingers on the hands, feet flexibly attached to the leg members, means for holding the feet to support the figure in any position, a neck member flexibly fastened to the body, a coiled spring loosely surrounding the neck member, a perforated jaw member flexibly fastened to the neck member, a perforated skull member attached to the neck member, a face of flexible rubber for the skull and jaw members and provided with holes exposing underlying members, a cord fastened to the inside of the flexible face at one side of the mouth and passing through holes in the skull at both sides of the point of attachment and having its ends attached to one of the disks after passing through the coil spring, a cord fastened to the inside of the brow of the flexible face and passing through holes in the skull above and below the brow and having its ends fastened to another disk after passing through the coil spring, a strap depending from the inside of the brow of the skull, wires extending from the strap and forming bearings for eyes which project through eye-holes in the skull, and an additional flexible wire on the strap and extending over the eyes and attached to the flexible cover to simulate adjustable eyelids.

7. In a figure, a body portion, a plurality of rotatable disks mounted in the body, leg members flexibly connected to the body, arm members flexibly attached to the body member, hands flexibly connected to the arm members, flexible fingers on the hands, feet flexibly attached to the leg members, means for holding the feet to support the figure in any position, a neck member flexibly fastened to the body, a coiled spring loosely surrounding the neck member, a perforated jaw member flexibly fastened to the neck member, a perforated skull member attached to the neck member, a face of flexible rubber for the skull and jaw members and provided with holes exposing underlying members, cords fastened to the inside of the flexible face and passing through holes in the skull, and having their ends attached to the disks after passing through the coil spring, a strap depending from the inside of the brow of the skull, wires extending from the strap and forming bearings for eyes which project through eye-holes in the skull, and an additional flexible wire on the strap and extending over the eyes and attached to the flexible cover to simulate adjustable eyelids.

8. In a figure, a body portion, a plurality of rotatable disks mounted in the body, leg members flexibly connected to the body, arm members flexibly attached to the body member, hands flexibly connected to the arm members, flexible fingers on the hands, feet flexibly attached to the leg members, means for holding the feet to support the figure in any position, a neck member flexibly fastened to the body, a coiled spring loosely surrounding the neck member, a perforated jaw member flexibly fastened to the neck member, a perforated skull member attached to the neck member, a face of flexible material for the skull and jaw members and provided with holes exposing underlying members, a cord fastened to the inside of the flexible face at one side of the mouth and passing through holes in the skull at both sides of the point of attachment and having its ends attached to one of the disks, a cord fastened to the inside of the flexible face at the other side of the mouth and passing through holes in the skull at both sides of the point of attachment and having its ends attached to the said disk, a cord attached to the inside of the flexible face at one side of the mouth and passing through a hole in the skull above and to the side of the point of attachment and through a hole in the jaw below and to the side of the point of attachment and having its ends attached to a second disk, a cord attached to the inside of the flexible face at the other side of the mouth and passing through a hole in the skull above and to the side of the point of attachment and through a hole in the jaw below and to the side of the point of attachment and having its ends attached to a third disk, a cord attached to the inside of the flexible face at one side of the nose and passing through a hole in the nose of the skull and attached to a fourth disk, a cord attached to the inside of the flexible face at the other side of the nose and passing through said hole in the nose of the skull and attached to said fourth disk, a cord attached to the inside of the flexible face below the nose and passing through a hole in the skull under the nose and attached to said fourth disk, a cord attached to the inside of the flexible face below the mouth and passing through a hole in the jaw and attached to a fifth disk, and a cord fastened to the inside of the brow of the flexible face and passing through holes in the skull above and below the brow and having its ends fastened to a sixth disk all of said cords passing through said coil spring between the disks and the skull and jaw.

9. In a figure, a body portion, a plurality of rotatable disks mounted in the body, leg members flexibly connected to the body, arm members flexibly attached to the body member, hands flexibly connected to the arm members, flexible fingers on the hands, feet flexibly attached to the leg members, means for holding the feet to support the figure in any position, a neck member flexibly fastened to the body, a perforated jaw member flexibly fastened to the neck member, a perforated skull member attached to the neck member, a face of flexible material for the skull and jaw members and provided with holes exposing underlying members, a cord fastened to the inside of the flexible face at one side of the mouth and passing through holes in the skull at both sides of the point of attachment and having its ends attached to one of the disks, a cord fastened to the inside of the flexible face at the other side of the mouth and passing through the holes in the skull at both sides of the point of attachment and having its ends attached to the said disk, a cord attached to the inside of the flexible face at one side of the mouth and passing through a hole in the skull above and to the side of the point of attachment and through a hole in the jaw below and to the side of the point of attachment and having its ends attached to a second disk, a cord attached to the inside of the flexible face at the other side of the mouth and passing through a hole in the skull above and to the side of the point of attachment and through a hole in the jaw below and to the side of the point of attachment and having its ends attached to a third disk, a cord attached to the inside of the flexible face at one side of the nose and passing through a hole in the nose of the skull and attached to a fourth disk, a cord attached to the inside of the flexible face at the other side of the nose and passing through said hole in the nose of the skull and attached to said fourth disk, a cord attached to the inside of the flexible face below the nose and passing through a hole in the skull under the nose and attached to said fourth disk, a cord attached to the inside of the flexible face below the mouth and passing through a hole in the jaw and attached to a fifth disk, and a cord fastened to the inside of the brow of the flexible face and passing through holes in the skull above and below the brow and having its ends fastened to a sixth disk.

10. In a figure, a body portion, a plurality of rotatable disks mounted in the body, a perforated jaw member, a perforated skull member, a face of flexible material for the skull and jaw members and provided with holes exposing underlying members, a cord fastened to the inside of the flexible face at one side of the mouth and passing through holes in the skull at both sides of the point of attachment and having its ends attached to one of the disks, a cord fastened to the inside of the flexible face at the other side of the mouth and passing through the holes in the skull at both sides of the point of attachment and having its ends attached to the said disk, a cord attached to the inside of the flexible face at one side of the mouth and passing through a hole in the skull above and to the side of the point of attachment and through a hole in the jaw below and to the side of the point of attachment and having its ends attached to a second disk, a cord attached to the inside of the flexible face at the other side of the mouth and passing through a hole in the skull above and to the side of the point of attachment and through a hole in the jaw below and to the side of the point of attachment and having its ends attached to a third disk, a cord attached to the inside of the flexible face at one side of the nose and passing through a hole in the nose of the skull and attached to a fourth disk, a cord attached to the inside of the flexible face at the other side of the nose and passing through said hole in the nose of the skull and attached to said fourth disk, a cord attached to the inside of the flexible face below the nose and passing through a hole in the skull under the nose and attached to said fourth disk, a cord attached to the inside of the flexible face below the mouth and passing through a hole in the jaw and attached to a fifth disk, and a cord fastened to the inside of the brow of the flexible face and passing through holes in the skull above and below the brow and having its ends fastened to a sixth disk.

11. In a figure, a body portion, a plurality of rotatable disks mounted in the body, a perforated jaw member, a perforated skull member, a face of flexible material for the skull and jaw members and provided with holes exposing underlying members, a cord fastened to the inside of the flexible face at one side of the mouth and passing through holes in the skull at both sides of the point of attachment and having its ends attached to one of the disks, a cord fastened to the inside of the flexible face at the other side of the mouth and passing through the holes in the skull at both sides of the point of attachment and having its ends attached to the said disk.

12. In a figure, a body portion, a plurality of rotatable disks mounted in the body, a perforated jaw member, a perforated skull member, a face of flexible material for the skull and jaw members and provided with holes exposing underlying members, a cord attached to the inside of the flexible face at one side of the mouth and passing through a hole in the skull above and to the side of the point of attachment and through a hole in the jaw below and to the side of the point of attachment and having its ends attached to a disk, a cord attached to the inside of the flexible face at the other side of the mouth and passing through a hole in the skull above and to the side of the point of attachment and through a hole in the jaw below and to the side of the point of attachment.

13. In a figure, a body portion, a plurality of rotatable disks mounted in the body, a perforated jaw member, a perforated skull member, a face of flexible material for the skull and jaw members and provided with holes exposing underlying members, a cord attached to the inside of the flexible face at one side of the nose and passing through a hole in the nose of the skull and attached to a disk, a cord attached to the inside of the flexible face at the other side of the nose and passing through said hole in the nose of the skull and attached to said disk.

14. In a figure, a body portion, a plurality of rotatable disks mounted in the body, a perforated skull member, a perforated jaw member, a face of flexible material for the skull and jaw members and provided with holes exposing underlying members, a cord attached to the inside of the flexible face below the nose and passing through a hole in the skull under the nose and attached to a disk, a cord attached to the inside of the flexible face below the mouth and passing through a hole in the jaw and attached to a second disk, and a cord fastened to the inside of the brow of the flexible face and passing through holes in the skull above and below the brow and having its ends fastened to a third disk.

15. In a figure, a hollow skull, a strap depending from the inside of the brow of the skull, wires extending from the strap and forming bearings for eyes which project through eyeholes in the skull, and eyes shiftably mounted in the bearings provided with holes for receiving means for shifting the eyes.

MILTON TENENBAUM.